June 9, 1953 C. B. UPTON 2,641,536
FLAKE REMOVAL FOR SOLVENT EXTRACTION TOWERS
Filed March 18, 1949 3 Sheets-Sheet 1
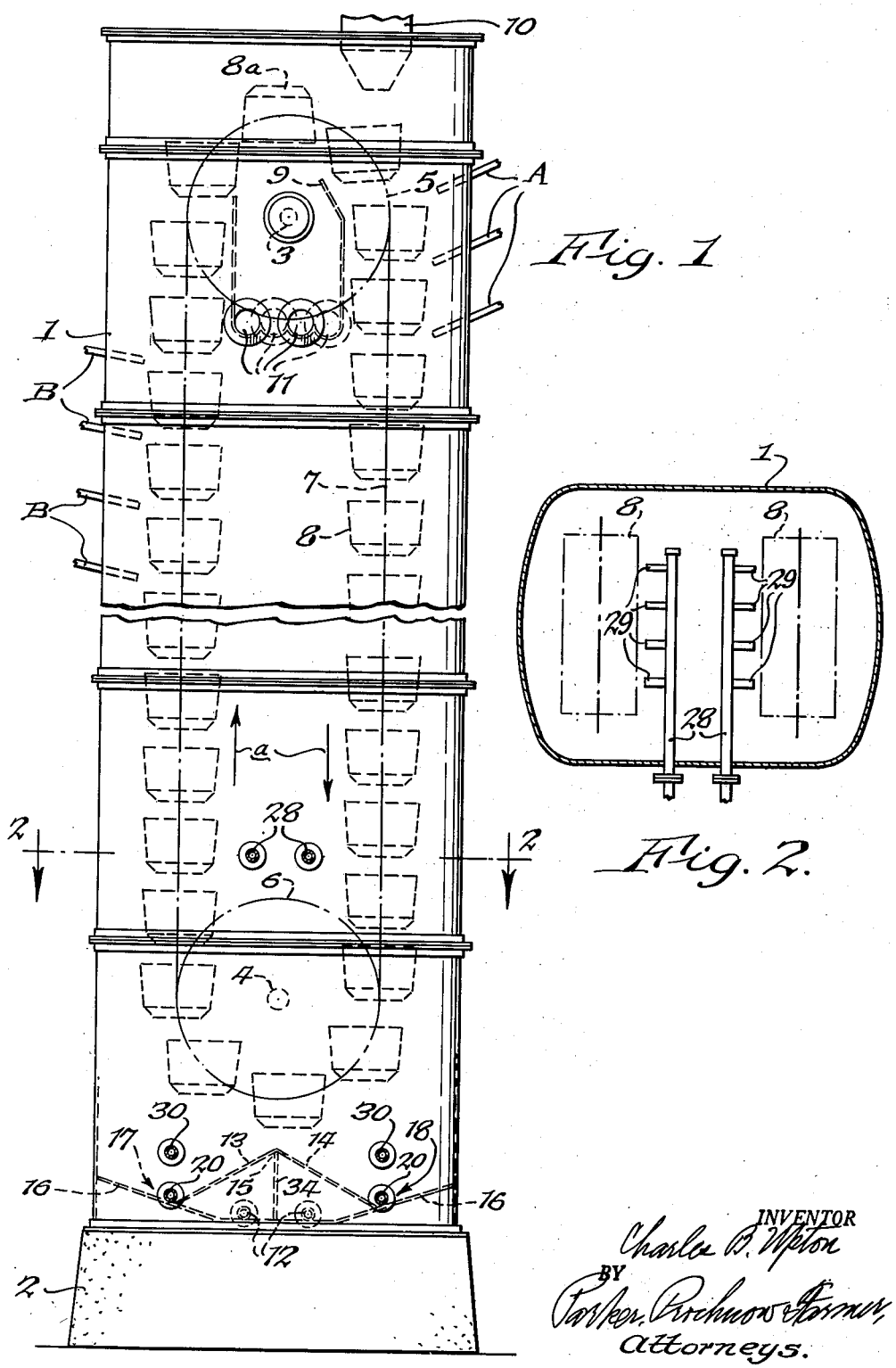

June 9, 1953 — C. B. UPTON — 2,641,536
FLAKE REMOVAL FOR SOLVENT EXTRACTION TOWERS
Filed March 18, 1949 — 3 Sheets-Sheet 2

INVENTOR.
Charles B. Upton,
BY Parker, Richmond & Turner,
Attorneys.

Patented June 9, 1953

2,641,536

UNITED STATES PATENT OFFICE 2,641,536

FLAKE REMOVAL FOR SOLVENT EXTRACTION TOWERS

Charles B. Upton, Piqua, Ohio, assignor to The French Oil Mill Machinery Company, Piqua, Ohio Application March 18, 1949, Serial No. 82,079

13 Claims. (Cl. 23—310)

This invention relates to solvent extraction apparatus, and particularly to the removal of flakes or solids from the bottom of the apparatus. An example of such solvent extraction apparatus, of the continuous basket or pater noster type of extractor, is disclosed by way of example in United States Patent #2,225,799, issued to H. S. Robinson on December 24, 1940, to which reference may be had for a full disclosure of one type of such apparatus. In prior extractors of this continuous basket type, difficulty has been experienced because of the collection in the bottom of the apparatus, or the bottom of the tower, of some of the flakes or solids that belch over the baskets at the time of filling and drop to the bottom. Flakes are also washed over the sides of the basket occasionally by improperly adjusted solvent and miscella application. An accumulation of the solids or flakes in the bottom of the tower eventually interferes with the removal of the miscella (a mixture of oil and solvent), and as a result it has been necessary to shut down the operation of such an apparatus at intervals in order to remove the accumulation of the flakes or solids from the bottom of the tower. Usually an operating cycle of from four to six weeks has been the maximum without a shut-down.

An object of the invention is to provide an improved method and apparatus for solvent extraction; which will give maximum effectiveness in extraction; which will continuously remove flakes or solids from the bottom of the extraction tower; and which will give cycles of operation indefinite in length.

Another object of this invention is to provide an improved method and apparatus for extending the operating period or cycle, before a shut-down for cleaning is necessary; which will provide improved efficiency and effectiveness of the solvent extraction; which will require a minimum of changes in existing constructions of extraction apparatus; and which will be relatively simple, practical, and inexpensive.

Other objects and advantages will be apparent from the following description of one embodiment of the invention, and the novel features will be particularly pointed out hereinafter in connection with the appended claims.

In the accompanying drawing:

Fig. 1 is a side elevation of an extraction tower of the continuous basket type in which the present invention has been incorporated;

Fig. 2 is a sectional plan of the same, the section being taken approximately along the line 2—2 of Fig. 1;

Figure 3:
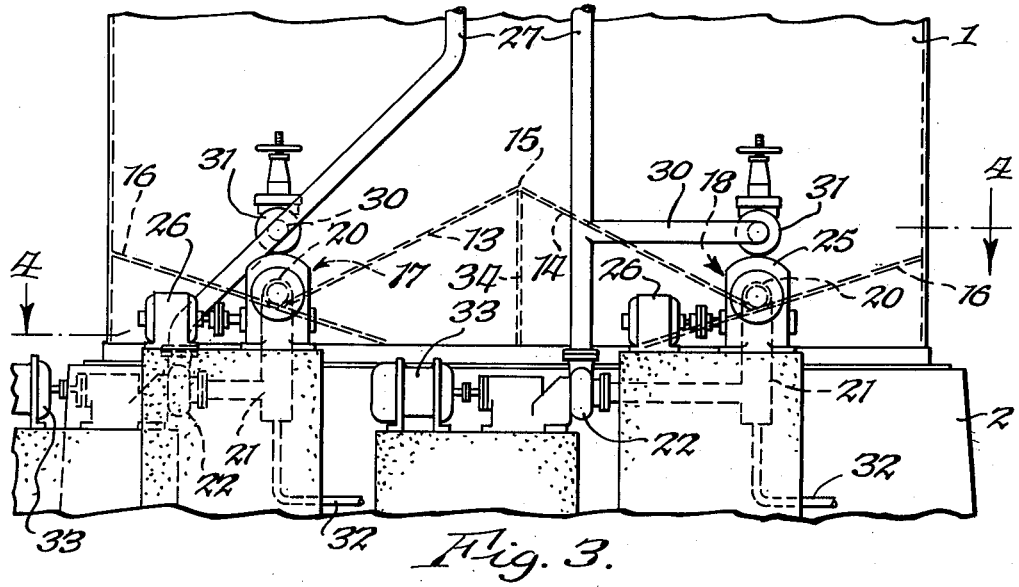
Fig. 3 is a side elevation, but on a larger scale, of the lower part of this apparatus.

In the illustrated embodiment of the invention, the extraction apparatus is of the continuous basket type such as is shown in said Robinson Patent No. 2,225,799, and inasmuch as the present invention relates only to certain details of that type of apparatus, only those parts of the apparatus directly concerned with this invention are illustrated in the accompanying drawings. For information as to details of this type of apparatus that are not illustrated in the accompanying drawings, reference may be had to said Robinson patent.

Extraction apparatus of this type includes a tower or upstanding shell 1 (Fig. 1) supported on a base 2, and usually formed of a plurality of superposed, connected sections. Disposed within this shell 1 are vertically spaced, horizontal shafts 3 and 4, on each of which is fixed a pair of sprocket wheels 5 and 6 respectively. The sprocket wheels 5 are spaced apart along the shaft 3, and similarly the sprocket wheels 6 are spaced apart along the shaft 4. Endless sprocket chains 7 pass around the vertically alined sprocket wheels 5 and 6, and these sprocket chains support between them a series of extraction buckets 8, which are hinged and held upright by gravity as they travel with the sprocket chains repeatedly downwardly and then upwardly in the shell 1.

Suitable means, not shown, is provided in the shell 1 for automatically inverting the buckets 8 as they pass over the shaft 3, one such bucket 8a being shown as inverted in Fig. 1. Below such inverted bucket is disposed a surge bin 9 open at its upper end, into which the contents of the baskets are discharged when the baskets are inverted. In Fig. 1, the direction of travel of the buckets is illustrated by the arrows $a$, and after the buckets are inverted they are again righted and pass beneath a filling chute 10 which automatically fills the buckets at the start of their descent in the shell 1. This filling is done automatically, and inasmuch as the details thereof are not a part of the present invention, they are not shown. As the buckets travel downwardly in the shell 1, they are sprayed at intervals with a miscella of solvent and extracted matter (discharged through the nozzles A), and this miscella seeps through the loose solids forming the charge disposed in each basket, and drips from basket to basket in the same vertical row or column. Baskets of this type have perforated bottoms, so that a liquid deposited in the baskets will seep through the particles of the charge in that basket and then pass downwardly, successively through basket after basket, and collect in the bottom of the tower or shell 1 at one side of an imperforate, upstanding separator plate 34 that is centrally disposed on the bottom of the tower.

As the baskets ascend and approach the upper end of their travel, they are again sprayed one or more times with a fresh or pure solvent (discharged through nozzles B) which seeps through the charges in the successive baskets, washes off any adherent miscella, and completes extraction of the desired component of the solids. The solvent, with the extracted material therein, which reaches the lower end of the ascending row of buckets, is discharged into the bottom of the tower or shell 1. The miscella discharged from the bottom of the buckets at the lower end of the ascending column or row is collected in the bottom on the other side of the separation plate 34.

Suitable openings 11 are provided in the surge bin 9 by which the treated solids may be removed, and this removal may be aided by screw conveyors passing through these openings 11, which carry the solids collecting in the bottom of the surge bin, out of the bin and deliver them into any suitable storage bin. Pipes 12 are disposed at the bottom of the tower, one at each side of the separator plate 34, to remove separately the miscella collecting in the bottom thereof at the opposite sides of plate 34, some of this miscella being removed for processing to recover the solvent and release the constituent dissolved therein, and some of it being discharged into the buckets at the upper end of the descending column. The solvent and miscella collected by pipe 12 below the ascending buckets are delivered to the descending buckets by means of nozzles A, or if desired, to the lower nozzles B.

A false bottom is provided in the bottom of the tower, and this false bottom is conveniently formed by two screen plates 13 and 14 which meet at 15 at the top of the separator plate 34, and descend therefrom in opposite directions towards the regular bottom 16. The regular bottom 16 slopes from opposite sides downwardly toward a central area of the base or floor of the shell 1, and the screen plates 13 and 14 engage the sloping walls 16 between their high and low points, so that two gutters 17 and 18 (Fig. 1) will be provided, one gutter below each row of buckets. Disposed at about the lowest point of each gutter is a screw conveyor 19 (Figs. 4 and 5) which passes lengthwise of the gutter and outwardly into and along a pipe 20 that opens out of a side of the shell 1, as shown in Fig. 5.

Figure 4:
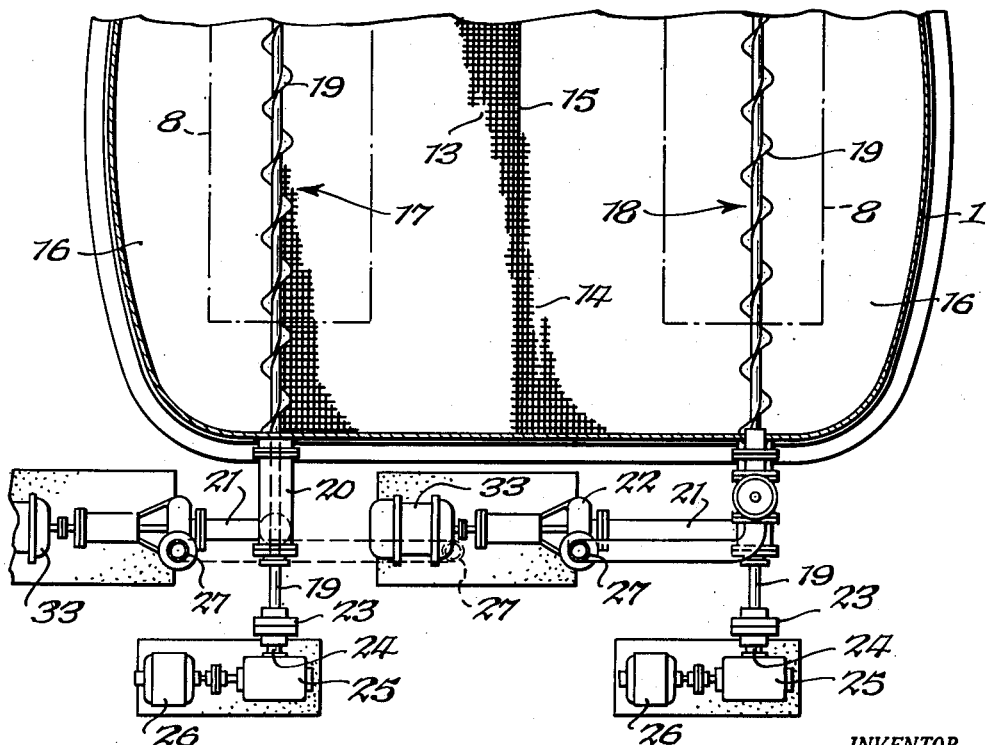
Fig. 4 is a sectional plan of a portion of the same, the section being taken approximately along the line 4—4 of Fig. 3, but also on a larger scale.

The pipe 20, after extending away from the shell 1 for a short distance, turns downwardly as at 21, where it leads to the intake side of a sludge pump 22. The shaft of the conveyor 19 passes outwardly through the pipe 20, and is driven by a coupling 23 from a shaft 24. The shaft 24 is rotated through a suitable speed reduction device 25, Fig. 4, driven by an electric motor 26. A separate motor 26 and speed reduction device 25 is provided for each screw conveyor 19, and there is a separate screw conveyor for each gutter 17 and 18, as shown in Fig. 4.

Figure 5:
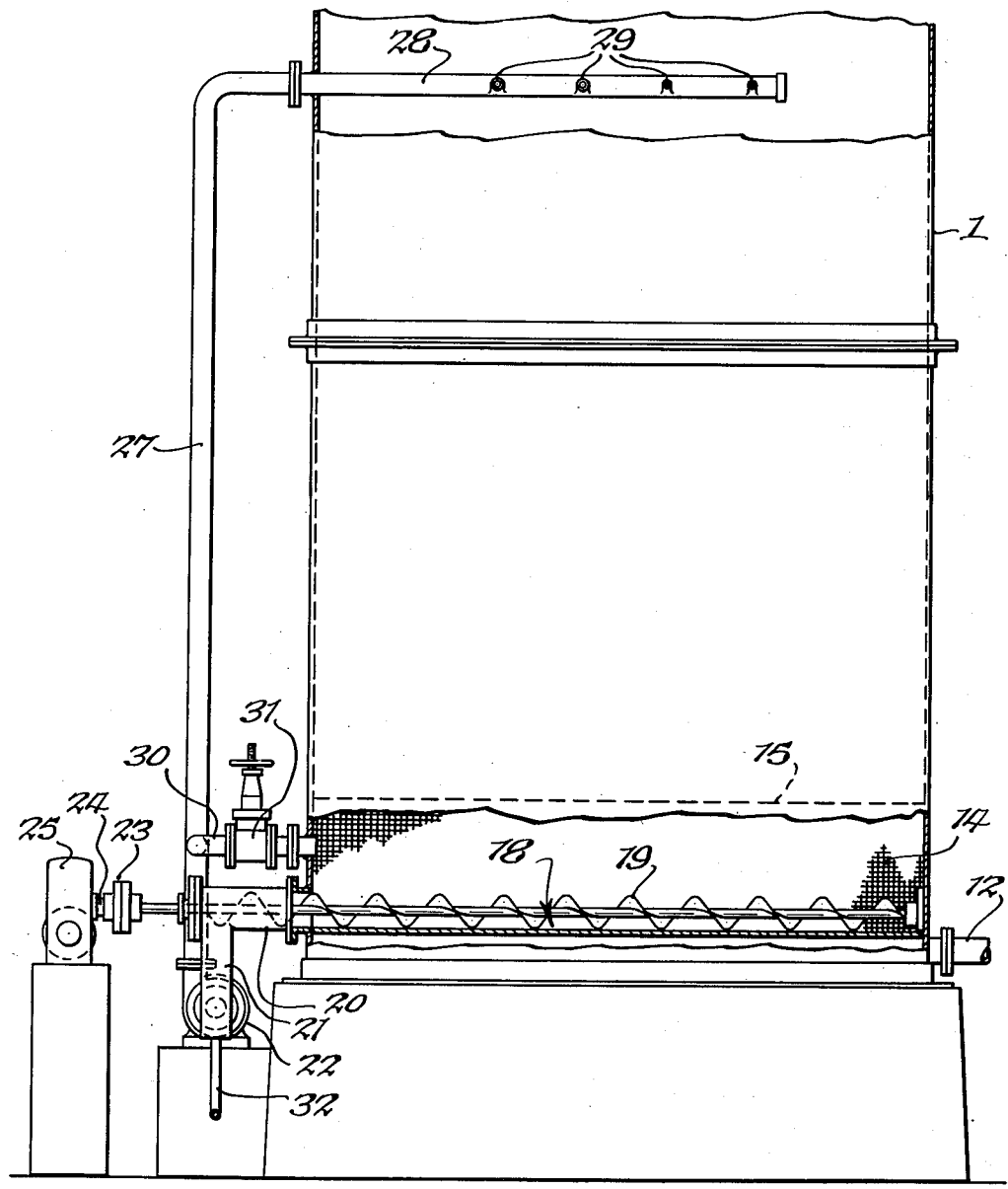
Fig. 5 is a side elevation of the lower part of the apparatus, also on a larger scale, with a portion broken away to show interior details.

The output side of each sludge pump 22 is connected to a related ascending pipe 27, which rises to a suitable height along the outside of the shell 1, such as about one-third of its height for example, and then is turned to extend horizontally at 28 into the interior of shell 1 between the ascending and descending columns of buckets as shown in Figs. 1, 2 and 5. The horizontal end 28 of each pipe 27 has a plurality of horizontally extending spouts 29 arranged in a row across the interior of the shell 1. The spouts of one pipe 28 discharge into the descending buckets as the buckets pass them in their descent, and the spouts 29 of the other pipe 28 discharge into the ascending buckets in succession.

Each ascending pipe 27 is provided with a by-pass pipe 30 which discharges into the column, just above the gutter to which its related sludge pump 22 is connected. Each by-pass pipe 30 is provided with an adjustable throttling valve 31, to control the rate at which the slurry removed from the gutters is discharged to the baskets. By by-passing some of the slurry back into the gutter, it tends to break down any ridge of flakes or solids that may build up over the screw conveyor in that gutter, and which might otherwise interfere with the free flow of flakes into the bottom of the gutter and into the helical grooves of the screw conveyor.

Any solids or flakes which accumulate in the bottom of the tower will thus be continuously removed and returned to the baskets, where the extraction action on those solids or flakes may continue, and which prevents clogging of the outlets at the bottom of the tower. This keeps the screens or perforated plates 13 and 14 clean so that the miscella may flow below the false bottom to the outlets 12. Each pipe 21 may have a branch 32 to the suction side of a miscella pump, as usual in this type of apparatus. Each sludge pump 27 is driven by a motor 33.

In the operation of such apparatus, the buckets are filled in succession through the chute 10, and as they descend and then ascend they are subjected to the solvent extraction. Any solids or flakes that escape from the baskets or buckets will collect in the bottom of the shell 1 in one of the gutters 17 and 18, and the miscella draining from the baskets or buckets also collects in the gutters 17 and 18 and washes the flakes or solids into the conveyor 19. This conveyor forcibly removes the flakes or solids with some miscella, as a slurry or sludge, and delivers this slurry to the sludge pump 22 which delivers part of it into the buckets and the rest of it into the gutter to wash other solids into the conveyor grooves and prevent the building up of any ridges or solids in the gutters.

It will be noted that the solids or flakes collecting below the descending row of buckets will be delivered back into the descending row of buckets, whereas the solids or flakes escaping from the ascending row of buckets will be returned to those buckets, and thus all of the particles will be given at least a selected minimum solvent extraction treatment. Thus maximum extraction will be secured from all of the solids. The collected flakes or solids will be distributed, a small amount in each basket. With such an arrangement, there will be no clogging through collection of solids in the bottom of the tower, and one may operate such apparatus indefinitely without any necessity for a shut-down for a cleaning. This greatly reduces operating costs. The recirculation of miscella and the flooding of the baskets with miscella has resulted in a somewhat better extraction from the flakes.

It will be understood that various changes in the details and arrangement of parts, which have been herein described and illustrated in order to explain the nature of the invention, may be made by those skilled in the art within the principle and scope of the invention, as expressed in the appended claims.

I claim as my invention:

1. In a solvent extraction device of the type having continuous baskets with perforated bottoms carried alternately in a descending column and then in an ascending column with filling means for depositing charges of solids to be treated in said baskets in succession as they start their descent, emptying means for removing the charges from the baskets near the ends of their ascent, and means for depositing a solvent in the descending and ascending baskets, that improvement therein which comprises a generally horizontal channel below the path of travel of the baskets into which miscella and solids escaping the baskets in each column will collect, a pipe opening horizontally into said channel close to its bottom wall and in a direction parallel to the bottom wall of the channel, a screw conveyor disposed along the bottom of the channel and extending into said pipe to carry a sludge of said solids and miscella into said pipe when the conveyor is rotated, drive means for rotating said conveyor, a pump withdrawing said sludge from said pipe, a conduit connected to the output side of the pump and discharging said sludge into said baskets intermediate the upper and lower limits of their travel, a side wall of said channel being a screen to drain off some of the miscella and exclude said solids, and means for collecting and removing miscella from beneath said screen.

2. In a solvent extraction device of the type having continuous baskets with perforated bottoms carried alternately in a descending column and then in an ascending column with hopper filling means for depositing charges of solids to be treated in said baskets in succession as they start their descent, emptying means for removing the charges from the baskets near the ends of their ascent, and means for depositing a solvent in the descending and ascending baskets, that improvement therein which comprises a generally horizontal channel below the path of travel of the baskets in each column into which miscella and solids escaping the baskets will drain, a pipe opening horizontally into said channel close to its bottom wall and in a direction parallel to the bottom wall of the channel, a screw conveyor disposed along the bottom of the channel and extending into said pipe to carry a sludge of said solids and miscella into said pipe when the conveyor is rotated, drive means for rotating said conveyor, a pump withdrawing said sludge from said pipe, a conduit connected to the output side of the pump and discharging said sludge into said baskets intermediate the upper and lower limits of their travel, a by-pass pipe leading from said conduit to the space just above the channel, a throttle valve in said by-pass pipe to control the proportion of sludge discharged directly back into said channel to wash solids into the bottom of the gutter, a wall of said channel being a screen to drain off some of the miscella and exclude said solids, and means for collecting and removing miscella from beneath said screen.

3. Solvent extraction apparatus of the continuous basket type comprising an upstanding housing, an endless carrier in said housing and having descending and ascending runs, baskets with perforated bottoms carried by said carrier, hopper means for filling said baskets in succession, at about the start of their descent, with charges of loose solids to be treated, conduit means for delivering solvent into said baskets during their travel, said housing having an inclined bottom beneath said carrier in which may collect miscella and loose solids escaping said baskets, a screen extending upwardly from and forming with said bottom a generally horizontal channel above the lowest part of said bottom, a pipe opening into said gutter, a pump having its suction side connected to said pipe, and a conduit into which said pump discharges and having a delivery end directed to discharge its fluid contents into said baskets in said runs intermediate their upper and lower limits, whereby increasing accumulations of said solids in the bottom of the housing will be prevented.

4. Solvent extraction apparatus of the continuous basket type comprising an upstanding housing, an endless carrier in said housing and having descending and ascending runs, baskets with perforated bottoms carried by said carrier, hopper means for filling said baskets in succession, at about the start of their descent, with charges of loose solids to be treated, pipe means for delivering solvent into said baskets during their travel, said housing having an inclined bottom in which may collect miscella and loose solids escaping said baskets, a screen extending upwardly from and forming with said bottom a generally horizontal channel above the lowest part of said bottom, a pipe opening horizontally into said channel in a direction lengthwise of the channel, a pump having its suction side connected to said pipe, a conduit into which said pump discharges and in turn discharging into said baskets in said runs intermediate their upper and lower limits, a branch conduit leading from said conduit and discharging a part of said sludge back into said gutter to wash solids into the bottom of the gutter, whereby increasing accumulations of said solids in the bottom of the housing will be prevented.

5. Solvent extraction apparatus of the continuous basket type, comprising an upright housing, an endless carrier in said housing having descending and ascending runs and movable linearly in a closed path, baskets with perforated bottoms carried by said carrier, means for filling said baskets as they pass one station in their travel, means for delivering a solvent into said filled baskets in succession during their travel with the carrier, said housing having an imperforate bottom with inclined sides, a screen element having the form of an acuate dihedral angle disposed centrally upon said bottom with the apex of the angle uppermost and the lower edges of the screen element engaging with the inclined sides, an outlet pipe leading from the bottom below said screen element, the sides of the screen element and the inclined sides of the bottom forming a pair of spaced gutters below the path of travel of the baskets, a delivery pipe leading horizontally from an end of each gutter, means in each gutter for propelling the contents of that gutter towards said delivery pipe, and a pump having its suction side connected to said delivery pipe, and a connection from its delivery side discharging into the buckets in succession.

6. Solvent extraction apparatus of the continuous basket type, comprising an upright housing, an endless carrier in said housing having descending and ascending runs and movable linearly in a closed path, baskets with perforated bottoms carried by said carrier, means for filling said baskets as they pass one station in their travel, means for delivering a solvent into said filled baskets in succession during their travel with the carrier, said housing having an imperforate bottom with inclined sides, a screen element having the form of an acute dihedral angle disposed centrally upon said bottom with the apex of the angle uppermost and the lower edges of the screen element engaging with the inclined sides, an outlet pipe leading from the bottom below said screen element, the sides of the screen element and the inclined sides of the bottom forming a pair of spaced gutters below the path of travel of the baskets, a delivery pipe leading horizontally from an end of each gutter, means in each gutter for propelling the contents of that gutter towards said delivery pipe, a pump having its suction side connected to said delivery pipe, a connection from its delivery side discharging into the buckets in succession, and a branch from said delivery side discharging into one of said gutters above the bottom thereof.

7. Solvent extraction apparatus of the continuous basket type, comprising an upright housing, an endless carrier in said housing having descending and ascending runs and movable linearly in a closed path, baskets with perforated bottoms carried by said carrier, means for filling said baskets as they pass one station in their travel, means for delivering a solvent into said filled baskets in succession during their travel with the carrier, said housing having an imperforate bottom with inclined sides, a screen element having the form of an acute dihedral angle disposed centrally upon said bottom with the apex of the angle uppermost and the lower edges of the screen element engaging with the inclined sides, an outlet pipe leading from the bottom below said screen element, the sides of the screen element and the inclined sides of the bottom forming a pair of spaced gutters below the path of travel of the baskets, a delivery pipe leading horizontally from an end of each gutter, means in each gutter for propelling the contents of that gutter towards said delivery pipe, a pump having its suction side connected to said delivery pipe, and a connection from its delivery side discharging into the buckets in succession, and a valve controlled branch from said delivery side discharging into one of said gutters above the bottom thereof.

8. Solvent extraction apparatus of the continuous basket type comprising a housing, a plurality of baskets with screened bottoms, a conveyor for moving said baskets in succession in an endless path in said housing, hopper means for filling said baskets in succession as they pass one station in their travel, spray means for delivering solvent into said filled baskets in succession, said housing having a gutter beneath said baskets to collect drainage therefrom, one side wall of said gutter being perforated to pass miscella and exclude the relatively large solids, said housing having a reservoir beneath said perforated side wall of the gutter to collect said passed miscella, a pipe opening into the lower part of said gutter, a sludge pump connected at its suction side to said pipe, a conduit connected to the outlet side of the pump and discharging sludge from the pump into the passing baskets in succession, and another pipe leading from said reservoir to remove the miscella draining therein.

9. Solvent extraction apparatus of the continuous basket type comprising a housing, a plurality of baskets with screened bottoms, a conveyor for moving said baskets in succession in an endless path in said housing, hopper means for filling said baskets in succession as they pass one station in their travel, spray means for delivering solvent into said filled baskets in succession, said housing having a gutter beneath said baskets to collect drainage therefrom, one side wall of said gutter being perforated to pass miscella but not the relatively large solids, said housing having a reservoir beneath said perforated side wall of the gutter to collect said passed miscella, a pipe opening into the lower part of said gutter, a sludge pump connected at its suction side to said pipe, a conduit connected to the outlet side of the pump and discharging sludge from the pump into the passing baskets in succession, and a branch from said conduit discharging back into said gutter from a level somewhat above its bottom to wash solids collecting on the side walls of the gutter into the bottom of the gutter for removal through said pipe.

10. Solvent extraction apparatus of the continuous basket type comprising a housing, a plurality of baskets with screened bottoms, a conveyor for moving said baskets in succession in an endless path in said housing, means for filling said baskets in succession as they pass one station in their travel, spray means for delivering solvent into said filled baskets in succession, said housing having a gutter beneath said baskets to collect drainage therefrom, one side wall of said gutter being perforated to pass miscella but not the relatively large solids, said housing having a reservoir beneath said perforated side wall of the gutter to collect said passed miscella, a pipe opening into the lower part of said gutter, a sludge pump connected at its suction side to said pipe, a conduit connected to the outlet side of the pump and discharging sludge from the pump into the passing baskets in succession, and a branch from said conduit discharging back into said gutter from a level somewhat above its bottom to wash solids collecting on the side walls of the gutter into the bottom of the gutter for removal through said pipe, said branch having an adjustable valve therein to regulate the proportion of sludge passing through said branch.

11. In the method of solvent extraction in which a series of separate charges of loose solids are conducted first in a vertically descending path and then in a vertically ascending path, during which solvent is passed by gravity in succession through the charges in each path, and collected in a gutter at the bottom of each path, that improvement which comprises flushing the sides of the gutter with some of the solvent and solids collected in the gutter to wash into the gutter any solids adhering to the sides of the gutter and thereby prevent the building up on the sides of the gutter of any ridges and collections of solids that might interfere with the free flow of solids and solvent into the gutter.

12. In the method of solvent extraction in which a series of separate charges of loose solids are conducted first in a vertically descending path and then in a vertically ascending path, during which solvent is passed by gravity in succession through the charges in each path, and collected in a gutter at the bottom of each path, that improvement which comprises flushing the sides of the gutter with some of the solvent and solids collected in the gutter to wash into the gutter any solids adhering to the sides of the gutter and thereby prevent the building up on the sides of the gutter of any ridges and collections of solids that might interfere with the free flow of solids and solvents into the gutter, and delivering another part of the collected solvent and solids from each gutter into the charges in the path above that gutter to have the solids filtered from the collected solvent and further treated with solvent.

13. In the method of solvent extraction in which a series of separate charges of loose solids are conducted first in a vertically descending path and then in a vertically ascending path, during which solvent is passed by gravity in succession through the charges in each path, and collected in a gutter at the bottom of each path, that improvement which comprises screening off some of the solvent free of larger solids through a wall of the gutter, then flushing the sides of the gutter with some of the solvent and solids collected in the gutter to wash into the gutter any solids adhering to the sides of the gutter and thereby prevent the building up on the sides of the gutter of any ridges and collections of solids that might interfere with the free flow of solids and solvent into the gutter.

CHARLES B. UPTON.

References Cited in the file of this patent

UNITED STATES PATENTS

| Number | Name | Date |
|---|---|---|
| 1,325,298 | Kestner | Dec. 16, 1919 |
| 2,112,805 | Bonotto | Mar. 29, 1938 |
| 2,225,799 | Robinson | Dec. 24, 1940 |
| 2,227,605 | Swallen et al. | Jan. 7, 1941 |
| 2,338,418 | Forrest et al. | Jan. 4, 1944 |
| 2,447,845 | Dinley | Aug. 24, 1945 |

FOREIGN PATENTS

| Number | Country | Date |
|---|---|---|
| 507,465 | Great Britain | June 15, 1939 |